United States Patent [19]
Ponziani

[11] Patent Number: 6,109,672
[45] Date of Patent: Aug. 29, 2000

[54] COMBINATION WINDOW RELEASE AND WIPER SYSTEM AND METHOD

[75] Inventor: Richard L. Ponziani, Centerville, Ohio

[73] Assignee: Valeo Electrical Systems, Inc., Auburn Hills, Mich.

[21] Appl. No.: 09/169,451

[22] Filed: Oct. 9, 1998

[51] Int. Cl.⁷ ..................................... E05C 3/16
[52] U.S. Cl. .................... 292/223; 15/250.3; 15/250.16; 15/250.19
[58] Field of Search .............................. 15/250.3, 250.31, 15/250.16, 250.17, 250.19; 292/201, 216, 223

[56] References Cited

U.S. PATENT DOCUMENTS

| | | | |
|---|---|---|---|
| 3,999,241 | 12/1976 | Mafnas | 15/250 |
| 4,336,482 | 6/1982 | Goertler et al. | 318/443 |
| 4,962,564 | 10/1990 | Onda et al. | 15/250 |
| 5,495,637 | 3/1996 | Egner-Walter | 15/250 |
| 5,559,410 | 9/1996 | Papazian et al. | 318/445 |
| 5,694,812 | 12/1997 | Maue et al. | 74/471 R |
| 5,764,010 | 6/1998 | Maue et al. | 15/250.16 X |
| 5,771,526 | 6/1998 | Burton | 15/250 |
| 5,823,065 | 10/1998 | Egner-Walter | 74/519 |
| 5,841,249 | 11/1998 | Zimmer et al. | 318/10 |
| 5,847,519 | 12/1998 | Kilker | 318/14 |
| 5,852,943 | 12/1998 | Dutka et al. | 70/237 |
| 5,903,114 | 5/1999 | Miller et al. | 318/10 |
| 5,907,885 | 6/1999 | Tilli et al. | 15/250.16 |
| 5,916,327 | 6/1999 | Maue et al. | 74/471 R |
| 5,924,324 | 7/1999 | Kilker et al. | 15/250.3 X |
| 5,949,206 | 9/1999 | Oruganty et al. | 318/280 |

Primary Examiner—B. Dayoan
Assistant Examiner—John B. Walsh
Attorney, Agent, or Firm—J. Gordon Lewis

[57] ABSTRACT

A window release and wiper system and method is shown using a window latch having a latch release arm. The latch release arm is coupled to an output shaft of a wiper motor which also drives a wiper arm and a wiper blade between an inwipe position and an outwipe position. As the wiper motor drives the wiper arm between the inwipe and outwipe positions, the latch release arm rides on the output shaft of the wiper motor. When it is desired to open the window, the wiper motor is energized to drive the wiper arm to a window release position which, in turn, simultaneously drives the latch release arm to engage and actuate a latch release lever to actuate a window latch to release or unlock the window. After the window is closed, the wiper motor may drive the wiper arm and wiper blade from the window release position towards the inwipe position. A one-way, spring-loaded latch member in the latch release arm is energized to permit the latch release arm to clear the latch release lever without axially driving the latch release lever, thereby permitting the latch release arm to clear the lever and assume a non-window release position.

21 Claims, 2 Drawing Sheets

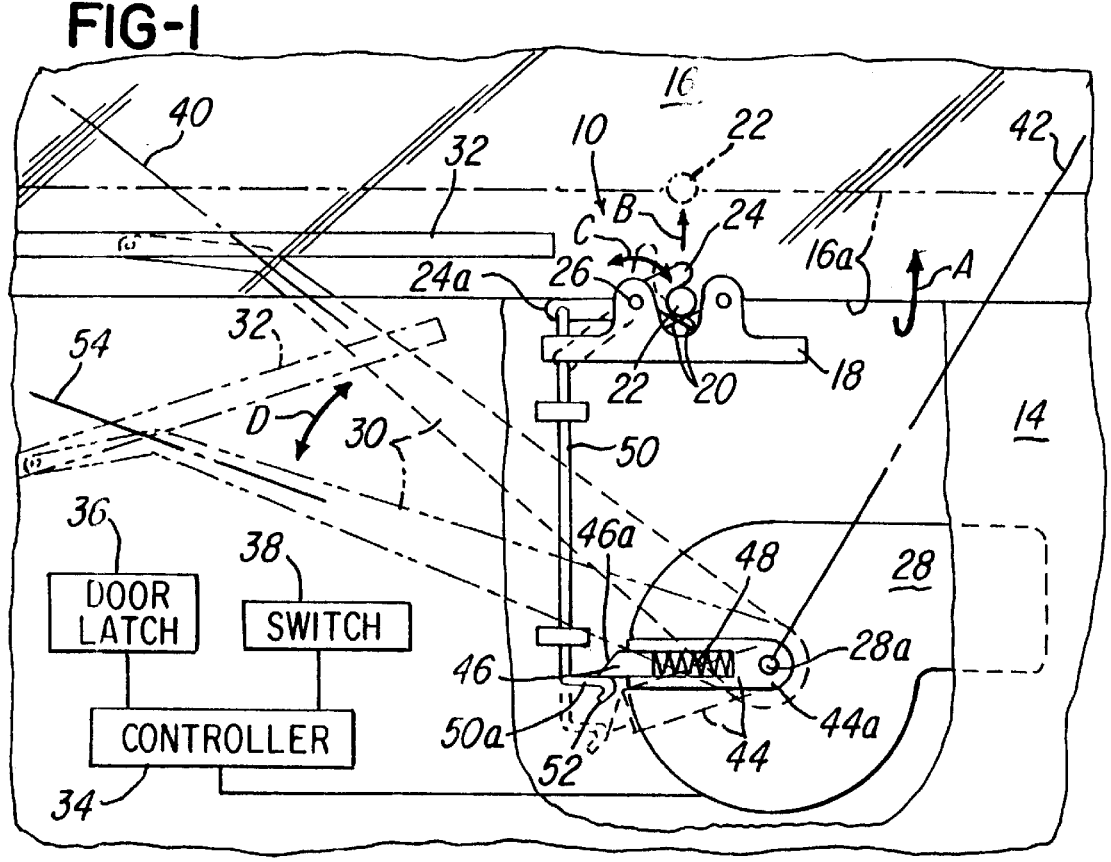
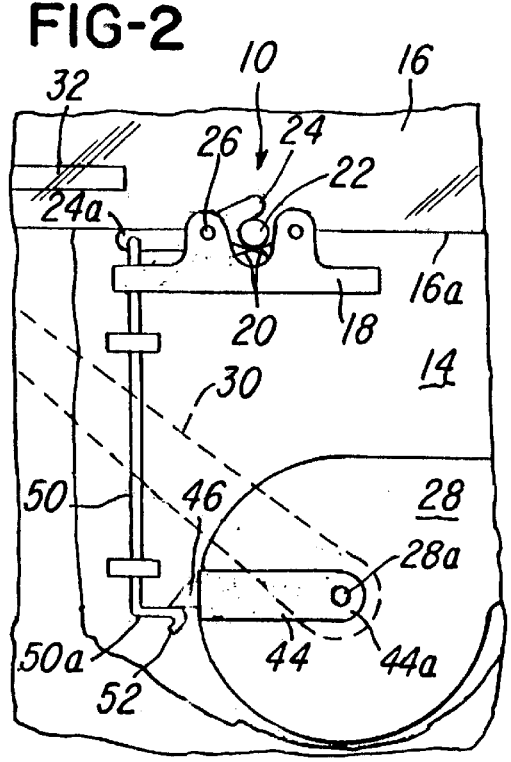
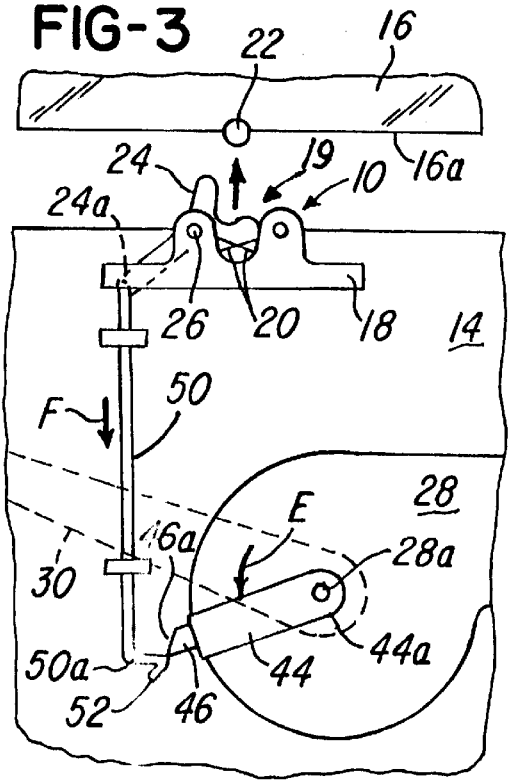

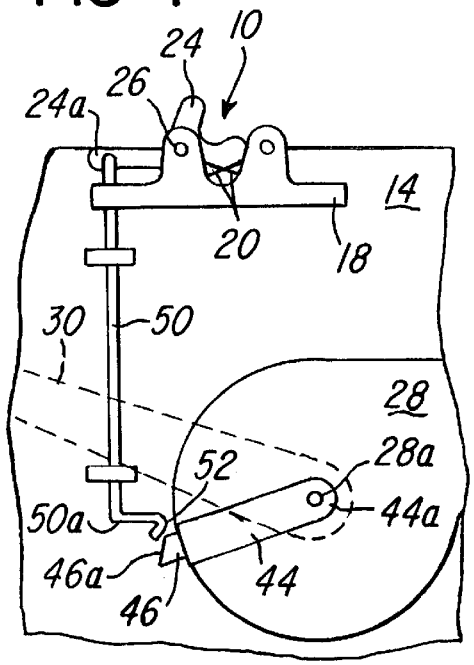
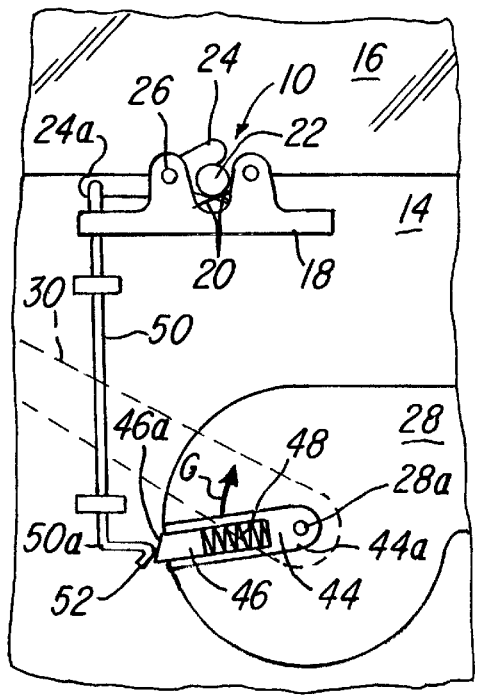
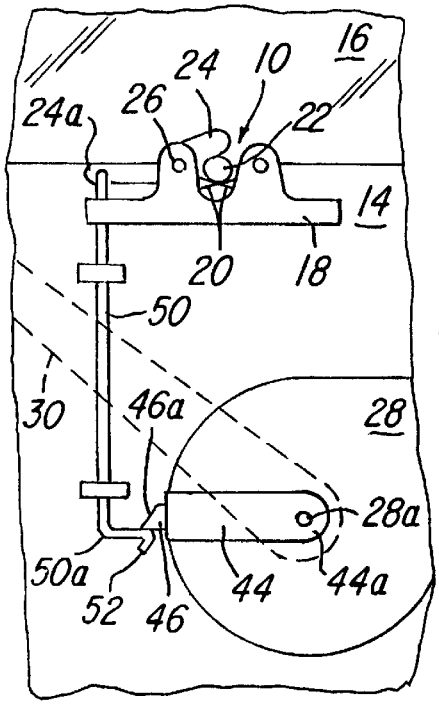
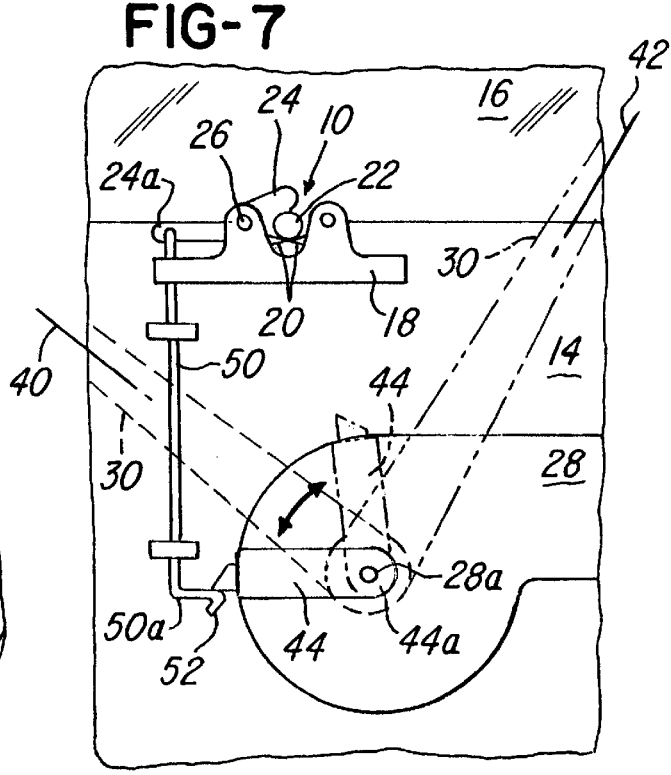

COMBINATION WINDOW RELEASE AND WIPER SYSTEM AND METHOD

BACKGROUND OF THE INVENTION

1. Field of the Invention

This invention relates to a window release mechanism and, more particularly, to a window release mechanism and wiper system which utilizes a single wiper motor to drive a wiper arm and also actuate a window release when the wiper arm is driven to a window release position.

2. Description of the Related Art

Many motor vehicles, such as minivans, sport utility vehicles and other vehicles, have a swing or side door or gate, such as a tailgate. Some automotive designs also provide for a rear window situated in the upper portion of the rear door or gate. The window is pivotally mounted to the vehicle at the top of the window so that the bottom of the window can be swung between a latched, closed position and a hold open position.

Many times, particularly with rear cargo access tailgates and windows, a window wiper for window clearing and cleaning is provided. Those model vehicles with a swing open window and a low mounted wiper must be designed so that the wiper arm and blade are moved off of the window so that the window can swing and pivot freely without interference from the wiper arm or blade. Some vehicles accommodate this by making a park position for the blades just below the glass. The glass can be opened while in this park position, and the wiper blade moves onto the glass when actuated. At shut off, it parks again off the glass.

A disadvantage of this approach includes an audible noise impact when the blade is moved between a parked and "on-glass" position. Additionally, a smaller wiper area oftentimes results.

In another arrangement, the wiper motor is at park position at the lower edge of the glass. When it is desired to open the window, the wiper arm and wiper blade must be moved to below the window, so that the window is free to swing for opening, thereby always maintaining a window swing arc which is clear of the wiper arm and wiper blade. In this type of design, the wiper arm and wiper blade are parked on the window, but driven by a wiper motor so that the arm and blade are driven below the bottom of the window when the window is swung open and, thereafter, returning to the on-window position when the window is closed. In this type of arrangement, the wiper motor was used to drive the wiper arm, and a separate power motor or key actuator was used to actuate a window release which released the window after the wiper motor drove the wiper arm and wiper blade to a window release position. Unfortunately, this design had various disadvantages, such as requiring additional motors, linkage and the like to effect permitting the wiper blade to remain on the window when not in use and driven to the window release position when it is desired to open the window.

What is needed, therefore, is a window release and wiper system and method which are simple in design and which facilitate reducing the number of parts by providing a system and method which can simultaneously actuate a window release to release the window when a wiper arm is driven to a window release position.

SUMMARY OF THE INVENTION

It is, therefore, a primary object of the invention to provide a window release and wiper system which is simple in design and which utilizes a single wiper motor to drive a wiper blade to a window release position and, simultaneously, actuate a window latch to release the window.

Another object of the invention is to provide a latch release arm which can be situated on a wiper motor and which actuates a window latch when the wiper arm is driven to a window release position.

Still another object of the invention is to provide a system and method for using a single wiper motor to drive a wiper arm into a window release position and, simultaneously, drive a latch release to an actuating position where the latch release actuates a window latch to unlock the window so that it may be opened.

In one aspect, this invention comprises a wiper motor window latch release comprising a wiper motor having an output shaft coupled to a wiper arm, a latch release, a window latch for locking a window in a closed position, a latch lever coupled to the window latch for actuating the window latch to release the window and a latch release arm also coupled to the output shaft, the latch release arm actuating the latch lever to release the window when the wiper motor drives the wiper arm to a window release position.

In another aspect, this invention comprises a window release and wiper system comprising a window latch for locking a window into a locked position, the window latch comprising a release lever for releasing the window latch when the release lever is actuated from a home position to an unlocked position wherein the window latch releases the window, at least one wiper arm having a blade secured thereto, a wiper motor comprising an output shaft coupled to at least one wiper arm for driving at least one wiper arm between an inwipe position and an outwipe position and also for driving at least one wiper arm to a window release position during which the window may be opened, a latch release arm also coupled to the output shaft such that when the wiper motor drives at least one wiper arm to the window release position, the latch release arm actuates the release lever to actuate the window latch to release the window.

In still another aspect, this invention comprises a wiper motor and window latch release comprising a wiper motor comprising an output shaft coupled to a wiper arm and a latch release associated with the output shaft for actuating a window latch when the wiper motor drives the wiper arm to a window release position.

In yet another aspect, this invention comprises a method for actuating a window latch to open a window comprising the steps of situating a wiper motor having a wiper arm secured thereto in operative relationship with the window latch and positioning a latch release in operative relationship with the wiper motor so that, when the wiper motor drives the wiper arm to a window release position, the latch release actuates the window latch to open the window Other objects and advantages of the invention will be apparent from the following description, the accompanying drawings, and the appended claims.

BRIEF DESCRIPTION OF ACCOMPANYING DRAWINGS

FIG. 1 is a fragmentary view showing a window release and wiper system of the present invention;

FIG. 2 is a fragmentary view showing a latch release arm in an inwipe position;

FIG. 3 is a fragmentary view similar to FIG. 2, showing the latch release arm as it actuates a latch release lever coupled to a window latch;

FIG. 4 is a fragmentary view similar to FIG. 3, showing the latch release arm clearing a leg member of the latch release lever;

FIG. 5 is a fragmentary view showing the latch release arm moving from a window release position towards an inwipe position where a wiper blade becomes resituated on the window;

FIG. 6 is a fragmentary view similar to FIG. 5 showing the latch clearing the leg member of the latch release lever when the wiper arm and wiper blade reach the inwipe position; and FIG. 7 is an illustration showing the latch release arm as it moves in response to the movement of the output shaft of a wiper motor as the wiper motor drives the wiper blade between the inwipe and an outwipe position.

DETAILED DESCRIPTION OF THE PREFERRED EMBODIMENT

Referring now to FIG. 1, a window release and wiper system 10 used on, for example, a vehicle having a rear door 14 and a window 16 having a window edge 16a which pivots in the direction of arrow A in FIG. 1 from a closed and locked position (illustrated in FIG. 1) to an open and unlatched position (shown in phantom in FIG. 1).

The window release and wiper system 10 comprises a window latch 18 having suitable springs 20 which act against a hook 22 situated on window 16 to bias the hook 22 in the direction of Arrow B in FIG. 1. The window latch 18 further comprises a lock 24 which pivots about axis 26 in the direction of double Arrow C from a locked position (shown in FIG. 1) to an unlocked position (shown in phantom), whereupon the window latch 18 releases to release the hook 22 to permit the window 16 to pivot away from the tailgate 14.

The window release and wiper system 10 further comprises a wiper motor 28 having an output shaft 28a which is coupled to a wiper arm 30 having a wiper blade for wiping the windshield 16 when the motor 28 is energized to drive wiper arm 30.

The window release and wiper system 10 further comprises a controller 34 which energizes wiper motor 28 in response to the actuation of a door latch 36 or at least one switch 38 which are operated by a user. When controller 34 energizes wiper motor 28, wiper motor 28 drives wiper arm 30 in the direction of double Arrow D in FIG. 1 from an inwipe position 40 to an outwipe position 42, thereby causing wiper blade 32 to wipe the windshield 16 free of debris, such as rain or snow.

Notice that the window release and wiper system 10 further comprises a latch release arm 44 having a one-way latch 46 which is biased to a locked position by a spring 48. The latch release arm 44 has a first end 44a which is mounted to output shaft 28a and which is driven directly by output shaft 28a to oscillate in the same manner as wiper arm 30.

Notice that the window latch 18 further comprises a latch release lever 50 which is coupled to an end 24a of lock 24 as illustrated in FIG. 1. The latch release lever 50 is generally L-shaped and comprises a leg member 50a having a guide 52 for engaging a beveled surface 46a of latch 46 to compress spring 48 so that the latch 46 can clear the leg member 50a after the window 16 has been released in a manner described later herein.

The operation of the window release and wiper system 10 will now be described relative to FIGS. 2–7. FIG. 7 illustrates the oscillation of the latch release arm 44 as it oscillates between the inwipe position 40 and the outwipe position 42. During this oscillation, the latch release lever 50 remains in a home or locked position such that the hook 22 remains in a locked position and is captured in the window latch 18 by lock 24, as illustrated in FIG. 1.

Upon the actuation of the door latch 36 or switch 38 (FIG. 1), the controller 34 energizes driver motor 28 to drive the wiper arm 30 to a window release position 54 (FIG. 1) during which the wiper blade 32 and wiper arm 30 become positioned below the window 16 (as viewed in FIG. 1), thereby permitting the glass 16 to pivot in the direction of Arrow A in FIG. 1.

As the output shaft 28a of drive motor 28 drives the latch release arm 44 in the direction of Arrow E (FIG. 3) the latch 46 drives leg member 50a which, in turn, drives latch release arm 50 in the direction of Arrow F which causes the latch release arm 50 to actuate and release the lock 24. The latch release arm 50 is driven until the latch 46 clears the leg member 50a. Notice that, when the latch 46 clears leg member 56a, the wiper arm 30 becomes positioned in the window release position illustrated in FIG. 4. In this position, the wiper arm 30 is clear of window 16, thereby permitting the window 16 to be moved between the closed position (illustrated in FIG. 1) and an open position (shown in phantom), without engaging either the wiper blade 32 or wiper arm 30.

Notice also that, after the latch release arm 44 has cleared the leg member 50a of latch release lever 50, latch release arm 50 becomes biased upward (as viewed in FIG. 1) by a spring (not shown) to resume the home and locked position.

The hook 22 on window 16 is driven into latch opening 19 when the user closes the window 16. When the window 16 is closed by the user, a spring (not shown) associated with hook 22 drives the lock 24 into the locked position to lock the window 16 shut until it is reopened as described earlier. When this happens, the controller 34 energizes wiper motor 28 to drive the wiper arm 30 back towards the inwipe position and latch release arm 44 toward guide 52 (i.e., in the direction of Arrow G in FIG. 5). The beveled surface 46a of the spring-loaded, one-way latch 46 engages the guide 52 to compress spring 48 and drive latch 46 so that it can move past the leg member 50a. Once the latch release arm 44 and latch 46 have cleared the leg member 50a, the latch release arm 44 returns to the inwipe position 40, whereupon the wiper blade 32 becomes operatively positioned against window 16. At this point, the window system may resume wiping when desired.

As mentioned earlier herein, FIG. 7 illustrates the oscillation of the latch release arm 44 as it oscillates between the inwipe position 40 and outwipe position 42. It should be appreciated that the latch release arm 44 sweeps in free space, leaving the latch release lever 50 undisturbed while doing so.

Advantageously, this window release and wiper system and method 10 provide means for utilizing a single wiper motor to drive a wiper arm 30 between and/or among the window release position 54, inwipe position 40 and outwipe position 42 while simultaneously actuating window latch 18 to release window 16 when the wiper arm 30 is driven to the window release position 54.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A wiper motor window latch release comprising:
   a wiper motor having an output shaft coupled to a wiper arm;
   a latch release;
   a window latch for locking a window in a closed position;
   a latch lever coupled to said window latch for actuating said window latch to release said window; and
   a latch release arm also coupled to said output shaft so that said latch release arm moves simultaneously and in the same direction as said wiper arm; said latch release arm actuating said latch lever to release said window when said wiper motor drives said wiper arm to a window release position.

2. A wiper motor window latch release comprising:
   a wiper motor having an output shaft coupled to a wiper arm;
   a latch release;
   a window latch for locking a window in a closed position;
   a latch lever coupled to said window latch for actuating said window latch to release said window; and
   a latch release arm also coupled to said output shaft; said latch release arm actuating said latch lever to release said window when said wiper motor drive said wiper arm to a window release position;
   wherein said latch release arm comprises a spring-loaded latch.

3. The wiper motor window latch release as recited in claim 1 wherein said window latch comprises a latch release lever; said latch release arm driving said latch release lever to actuate said window latch when said wiper arm is driven to said window release position.

4. The wiper motor window latch release as recited in claim 3 wherein said latch release lever is generally L-shaped.

5. The wiper motor window latch release as recited in claim 2 wherein said spring-loaded latch comprises a one-way latch member.

6. The wiper motor window latch release as recited in claim 5 wherein said one-way latch member comprises a beveled surface to enable said latch release arm to assume a locked position when said wiper arm is in either a park mode or a wipe mode and further enabling an edge of said one-way latch member to drive said latch release arm to release said window when said wiper motor drives said wiper arm to a window release position.

7. A window release and wiper system comprising:
   a window latch for locking a window into a locked position, said window latch comprising a release lever for releasing said window latch when said release lever is actuated from a home position to an unlocked position wherein said window latch releases said window;
   at least one wiper arm having a blade secured thereto;
   a wiper motor comprising an output shaft coupled to said at least one wiper arm for simultaneously driving said at least one wiper arm between an inwipe position and an outwipe position and also for driving said at least one wiper arm in the same direction as said at least one wiper arm to a window release position during which said window may be opened;
   a release arm responsive to said wiper motor to actuate said window latch to release said window.

8. A window release and wiper system comprising:
   a window latch for locking a window into a locked position, said window latch comprising a release lever for releasing said window latch when said release lever is actuated from a home position to an unlocked position wherein said window latch releases said window;
   at least one wiper arm having a blade secured thereto;
   a wiper motor comprising an output shaft coupled to said at least one wiper arm for driving said at least one wiper arm between an inwipe position and an outwipe position and also for driving said at least one wiper arm to a window release position during which said may be opened;
   a release arm responsive to said wiper motor to actuate said window latch to release said window;
   wherein said latch arm comprises a spring-loaded latch.

9. The wiper motor window latch release as recited in claim 7 wherein said latch release lever is generally L-shaped.

10. The wiper motor window latch release as recited in claim 8 wherein said spring-loaded latch comprises a one-way latch member.

11. The wiper motor window latch release as recited in claim 7 wherein said release comprises a latch release arm coupled to said output shaft for actuating said window latch when said wiper motor drives said window to the window release position.

12. A wiper motor and window latch release comprising:
    a wiper motor comprising an output shaft coupled to a wiper arm; and
    a latch release coupled to said output shaft so that said latch release arm moves simultaneously and in the same direction as said wiper arm for actuating a window latch when said wiper motor drives said wiper arm to a window release position.

13. A wiper motor and window latch release comprising:
    a wiper motor comprising an output shaft coupled to a wiper arm; and
    a latch release associated with said output shaft for actuating a window latch when said wiper motor drives said wiper arm to a window release position;
    wherein said latch release comprises a spring-loaded latch.

14. The wiper motor window latch release as recited in claim 12 wherein said window latch comprises a latch release lever; said latch release engageably driving said latch release lever to actuate said window latch when said wiper arm is driven to said window release position.

15. The wiper motor window latch release as recited in claim 14 wherein said latch release lever is generally L-shaped.

16. The wiper motor window latch release as recited in claim 13 wherein said spring-loaded latch comprises a one-way latch member.

17. A method for actuating a window latch to open a window comprising the steps of:
    situating a wiper motor having a wiper arm secured thereto in operative relationship with the window latch; and
    positioning a latch release in operative relationship with said wiper motor so that, when said wiper motor drives said wiper arm to a window release position, said latch release simultaneously actuates said window latch in the same direction and arc length to open said window.

18. A method for actuating a window latch to open a window comprising the steps of:
- situating a wiper motor having a wiper arm secured thereto in operative relationship with the window latch; and
- positioning a latch release in operative relationship with said wiper motor so that, when said wiper motor drives said wiper arm to a window release position, said latch release actuates said window latch to open said window;
- wherein said method further comprises the step of:
- situating a latch release arm on an output shaft of said wiper motor, said latch release lever comprising a one-way latch for actuating said window latch to release said window.

19. The method as recited in claim 18 wherein said one-way latch is spring loaded.

20. The method as recited in claim 19 wherein said one-way latch comprises a beveled surface.

21. A method for actuating a window latch to open a window comprising the steps of:
- situating a wiper motor having a wiper arm secured thereto in operative relationship with the window latch; and
- positioning a latch release in operative relationship with said wiper motor so that, when said wiper motor drives said wiper arm to a window release position, said latch release actuates said window latch to open said window;
- situating a latch release arm on an output shaft of said wiper motor, said latch release lever comprising a one-way latch for actuating said window latch to release said window;
- providing a switch which, when actuated, causes said wiper motor to be energized to drive said wiper arm to said window release position and simultaneously casing said latch release to actuate said window latch to open said window as said window is driven to said release position.

* * * * *